(12) United States Patent
Lucks et al.

(10) Patent No.: US 11,447,160 B2
(45) Date of Patent: Sep. 20, 2022

(54) EXTRACTION DEVICE FOR DISCHARGING MIXED FLUID, IN PARTICULAR CONTAINING FECES, FROM A COLLECTING TANK

(71) Applicant: VOGELSANG GMBH & CO. KG, Essen (DE)

(72) Inventors: Hermann Lucks, Werlte (DE); Michael Heitmann, Cappeln (DE)

(73) Assignee: VOGELSANG GMBH & CO KG, Essen (DE)

( * ) Notice: Subject to any disclaimer, the term of this patent is extended or adjusted under 35 U.S.C. 154(b) by 310 days.

(21) Appl. No.: 16/573,467

(22) Filed: Sep. 17, 2019

(65) Prior Publication Data

US 2020/0086894 A1   Mar. 19, 2020

(30) Foreign Application Priority Data

Sep. 18, 2018 (DE) .......................... 202018105346.9

(51) Int. Cl.
| | |
|---|---|
| *B61D 35/00* | (2006.01) |
| *F16K 3/04* | (2006.01) |
| *F16K 31/53* | (2006.01) |
| *F16K 31/60* | (2006.01) |

(52) U.S. Cl.
CPC .............. *B61D 35/007* (2013.01); *F16K 3/04* (2013.01); *F16K 31/535* (2013.01); *F16K 31/602* (2013.01)

(58) Field of Classification Search
CPC ....... B61D 35/007; F16K 3/04; F16K 31/535; F16K 31/602; F16L 37/16; F16L 37/44
See application file for complete search history.

(56) References Cited

U.S. PATENT DOCUMENTS

| | | | |
|---|---|---|---|
| 2,770,474 A | 11/1956 | Krapp | |
| 2,983,479 A * | 5/1961 | Thomas | ................... F16K 31/54 251/250 |
| 4,103,712 A | 8/1978 | Fletcher et al. | |
| 4,135,551 A | 1/1979 | Knight et al. | |
| (Continued) | | | |

FOREIGN PATENT DOCUMENTS

| | | |
|---|---|---|
| CN | 101680247 | 3/2010 |
| CN | 102902305 | 1/2013 |
| (Continued) | | |

*Primary Examiner* — Kenneth Rinehart
*Assistant Examiner* — Nicole Gardner
(74) *Attorney, Agent, or Firm* — Price Heneveld LLP (57) ABSTRACT

An extraction device for discharging a mixed fluid, in particular containing feces, from a collecting tank of a rail vehicle comprises a housing having a mixed fluid inlet and a mixed fluid outlet, a flow passage which extends in the housing between the inlet and the outlet, a retaining latch mounted to the housing and adapted to cooperate with a corresponding recess on the collecting tank and is pivotably reciprocal between a locked position and an unlocked position, a shut-off member reciprocable between a release position and a blocking position, and a handling means or actuator mounted to the housing for actuation of the shut-off member. The handling means is operatively connected to the retaining latch in such a way that upon the movement of the retaining latch into the unlocked position the shut-off member is put into the blocking position.

18 Claims, 5 Drawing Sheets

(56) References Cited

U.S. PATENT DOCUMENTS

| | | | | |
|---|---|---|---|---|
| 4,234,161 A | * | 11/1980 | Wilder | F16L 37/1205 |
| | | | | 137/614.06 |
| 4,575,130 A | * | 3/1986 | Pemberton | F16L 37/18 |
| | | | | 141/349 |
| 5,535,984 A | * | 7/1996 | Anderson | F16L 37/20 |
| | | | | 251/149.9 |
| 5,671,777 A | * | 9/1997 | Allen | F16L 37/36 |
| | | | | 137/614.06 |
| 6,354,320 B1 | * | 3/2002 | Kolacz | B05B 12/08 |
| | | | | 137/38 |
| 8,113,240 B2 | * | 2/2012 | Blanchard | F16K 35/04 |
| | | | | 137/630.14 |
| 2002/0171057 A1 | | 11/2002 | Scobie | |
| 2011/0005639 A1 | * | 1/2011 | Weh | F16L 37/121 |
| | | | | 141/311 R |
| 2019/0211809 A1 | * | 7/2019 | Abaitancei | B60T 1/10 |

FOREIGN PATENT DOCUMENTS

| | | |
|---|---|---|
| CN | 103328300 | 9/2013 |
| DE | 4235887 | 4/1994 |
| DE | 202004019308 | 4/2006 |
| DE | 102007011210 | 4/2008 |
| DE | 202011002009 | 4/2012 |
| DE | 102012103061 | 9/2013 |
| WO | 2015095964 | 7/2015 |

\* cited by examiner

EXTRACTION DEVICE FOR DISCHARGING MIXED FLUID, IN PARTICULAR CONTAINING FECES, FROM A COLLECTING TANK

CROSS-REFERENCE TO FOREIGN PRIORITY APPLICATION

The present application claims the benefit under 35 U.S.C. §§ 119(b), 119(e), 120, and/or 365(c) German Application No. 202018105346.9 filed Sep. 18, 2018.

FIELD OF THE INVENTION

The invention concerns an extraction device for discharging a mixed fluid, in particular containing feces, from a collecting tank, in particular from a feces tank of a rail vehicle, comprising a housing having a mixed fluid inlet and a mixed fluid outlet, a flow passage which extends in the housing between the inlet and the outlet, a retaining latch which is mounted to the housing and which is adapted to cooperate with a corresponding recess on the collecting tank and is pivotably reciprocal between a locked position and an unlocked position, a shut-off member which is reciprocable between a release position and a blocking position, and a handling means mounted to the housing for actuation of the shut-off member.

Vehicles, in particular rail vehicles or also other heavy goods and private vehicles, for example, caravans and camper vans, frequently have collecting tanks for collecting feces. Those collecting tanks have to be emptied at regular intervals. For that purpose, collecting tanks frequently have an outlet, for example, a connection at an outside of a vehicle, at which a hose coupling of an extraction hose can be connected so that the feces in the tank can be sucked away by means of a reduced pressure.

BACKGROUND OF THE INVENTION

Conventional extraction devices or extraction couplings frequently have a shut-off member for closing the flow passage and a locking mechanism for locking the extraction device to the connection of the collecting tank. If the flow passage is not closed by the shut-off member prior to unlocking of the extraction device, feces escape. Such a discharge of mixed fluid (for example, feces) is not only undesirable by virtue of the bad smell but also leads to contamination of the extraction device and the collecting tank and is also to be deemed objectionable from the points of view of health and water protection.

In addition, when using such extraction devices, it is generally necessary, in a first step, to lock the extraction device to the connection by means of a locking mechanism before in a second step the shut-off member can be actuated to open the flow passage, and vice-versa. Such devices are disclosed in U.S. Pat. No. 4,103,712 A and US 2002/0171057 A1.

The known devices only permit the shut-off member to be opened after coupling has occurred. A further handling step which is to be carried out separately is, therefore, required. From a practical point of view, however, coupling of the locking mechanism to the shut-off member is desirable.

The object of the present invention, therefore, is to provide an extraction device which is improved in regard to at least one of the specified disadvantages. In particular, the object of the invention is to provide an extraction device involving simplified operation with the same degree of security in terms of preventing the issue of mixed fluid from the collecting tank.

SUMMARY OF THE INVENTION

In an extraction device of the kind set forth in the opening part of this specification the object of the present invention is attained in that the handling means is operatively connected to the retaining latch in such a way that upon the movement of the retaining latch into the unlocked position the shut-off member is put into the blocking position. The shut-off member can thus be moved by the handling means from a release position, in which the mixed fluid inlet and the mixed fluid outlet are in fluid communication through the flow passage, into a blocking position, in which the flow passage is closed by the shut-off member. There is thus provided an extraction device in which the shut-off member is put into the blocking position as soon as the retaining latch is moved into the unlocked position. Closure of the flow passage is thus effectively ensured without the requirement for an additional operating step and the unwanted issue of mixed fluid from the collecting tank is effectively avoided.

According to an advantageous development of the invention the handling means is operatively connected to the retaining latch in such a way that in the movement of the shut-off member into the release position, the retaining latch is put into the locked position. Operation of the extraction device is thus simplified by simultaneous actuation of the shut-off member and the retaining latch for locking the extraction device and the initiation of the suction removal procedure is accelerated.

It is also in accordance with the invention that, in such an extraction device, by virtue of locking of the retaining latch, simultaneously the shut-off member is opened and the suction removal procedure is initiated. An additional operating step is thus also eliminated in this situation so that operation of the extraction device if further simplified.

According to a preferred embodiment of the invention, the extraction device further includes a coupling body, in particular, a wedge, which is moveable along a longitudinal axis and which is operatively connected to the handling means and is adapted to reciprocate the retaining latch between the locked position and the unlocked position. The provision of a coupling body which is preferably in the form of a wedge proposes a simple and functional component for coupling the retaining latch to the handling means. They are mechanically coupled in such a way that the shut-off member is put into the blocking position by the handling means as soon as the retaining latch is moved into the unlocked position. Preferably the coupling body is further adapted to put the retaining latch into the locked position as soon as the shut-off member is put into the release position by actuation by means of the handling means.

In a preferred embodiment the recess in the collecting tank is provided in the region of a connection which can be coupled to the mixed fluid inlet and the retaining latch is mounted pivotably to the region of the mixed fluid inlet and is adapted to be brought into engagement with the connection of the collecting tank. Accordingly, the extraction device is already locked upon first contact between the collecting tank and the extraction device, which usually takes place between the connection of the collecting tank and the mixed fluid inlet of the extraction device. Thus, for example, grooves extending in the peripheral direction can be provided at the outside of the connection and into which the retaining latch engages by a pivotal movement. The process time is thus reduced as the first contact between the collecting tank and the extraction device already permits locking by the retaining latch.

According to a preferred embodiment of the invention, the shut-off member is arranged rotationally moveably in the housing and the release position and the blocking position of the shut-off member correspond to different rotary positions of the shut-off member. Preferably, the axis of rotation of the shut-off member is parallel, particularly preferably coaxial, relative to a longitudinal axis of the flow passage in which the shut-off member is arranged.

Preferably, the handling means is operatively connected to the shut-off member by means of a gear transmission, wherein the gear transmission is adapted to convert the actuating movement of the handling means into the rotary movement of the shut-off member.

In preferred embodiments, the shut-off member has a constriction body which is mounted moveably in the housing and is adapted to reduce a cross section of the flow passage portion-wise or along its entire longitudinal axis and wherein the handling means is adapted to actuate the shut-off member by movement of the constriction body. A constriction body which reduces the cross section of the flow passage ensures, in a simple fashion, from the point of view of structure, that the flow passage is shut off in order to separate the mixed fluid inlet of the extraction device from the connection of the collecting tank. In addition, that permits simple as well as robust mechanical actuation by the handling means, which can be performed manually or by motor means. The device according to the invention involves a low degree of wear and a low level of maintenance and is also cost-effective. The suction removal procedure can firstly be begun with a large flow passage cross-section so that a high volume flow is achieved.

Preferably, the handling means has a slider and the coupling body is arranged on the slider. The handling means for locking and unlocking the shut-off member is reciprocated along the housing, as the slider. By virtue of the arrangement of the coupling body on the slider, corresponding to the retaining latch, that equally performs a movement along the longitudinal axis and can therefore be brought into engagement with the retaining latch. The retaining latch is thereupon reciprocated between the locked position and the unlocked position in dependence on the position of the slider.

The combination of a linearly moveable slider with a rotatable arrangement of the shut-off member has been proven to be particularly advantageous. In that case the linear movement of the slider is converted into a rotational movement of the shut-off member. The linear movement of the handling means is user-intuitive for coupling and uncoupling the extraction device, and at the same time implementation of a rotational movement of the shut-off member and the constriction body permits a compact structure to be achieved.

According to a further preferred embodiment, the handling means has a toggle lever and the coupling body is coupled to the toggle lever by means of a rotatably mounted lever. In this embodiment the coupling body functions as a slider. A toggle lever is intuitive to actuate in a simple fashion and affords a high level of security. By virtue of the coupling body being coupled by means of a rotatably mounted lever to the toggle lever, the coupling body can be moved towards the retaining latch, by implementation of a pivotal movement of the toggle lever, linearly, that is to say, along the longitudinal axis, in order to reciprocate same between a locked position and an unlocked position.

Preferably, provided on the housing is a groove adapted to guide the coupling body. This will prevent malfunctioning of the coupling body by rotation or tilting, for example, due to a dynamic loading on the extraction device as a consequence of the tank being pumped out.

Preferably, in addition to the locking position and the release position, the shut-off member is moveable into a slurp position so that the shut-off member is adapted to fluid-tightly close the flow passage in the blocking position, to open it in the release position, and in the slurp position to only constrictively open it in such a way that in the slurp position the cross section of the flow passage is smaller than in the release position. The multi-functionality of the shut-off member therefore eliminates the need for an additional shut-off valve, whereby the structure of the extraction device is substantially simplified. In that way, the weight of the extraction device according to the invention is also reduced. In alternative embodiments, a closure element which is adapted to close the flow passage would be activatable, for example, by a movement of the shut-off member into the blocking position. Thus, it is also possible to vary the diameter of the flow passage, preferably during a suction removal procedure.

By virtue of the movement of the shut-off member into the slurp position, in which the cross section of the flow passage is less than in the release position, the fluid in the flow passage is accelerated in relation to the speed in the outlet of the collecting tank so that a turbulent flow is generated. The turbulent flow provides that even solid or highly viscous constituents of the mixed fluid are entrained and sucked away. In that case, the effect is not just relative to the flow passage, but rather also at least portion-wise to the outlet of the collecting tank, in particular, a coupled connection, so that the latter is also freed of mixed fluid or feces.

In a further preferred configuration in which the shut-off member is arranged rotatably in the housing, wherein the release position and the blocking position of the shut-off member correspond to different rotary positions of the shut-off member, and the slurp position corresponds to a further rotary position of the shut-off member.

Preferably, in that case, the slurp position is arranged between the release position and the blocking position. The consequence of this is that, each time the extraction device is to be uncoupled, the shut-off member must necessarily pass through the slurp position when the handling means is actuated for unlocking the retaining latches. That, in turn, ensures that the extraction device is always feces-free at its inlet end when the extraction device is uncoupled.

BRIEF DESCRIPTION OF THE DRAWINGS

The invention is described in greater detail hereinafter with reference to the accompanying Figures and by means of a preferred embodiment by way of example. In the Figures.

DETAILED DESCRIPTION OF THE EMBODIMENTS

The specifically described embodiments by way of example hereinafter respectively show a mechanically manually actuable extraction device. It should be appreciated that, in particular, manual actuation respectively represents a preferred configuration, but also as a departure therefrom there can be other modes of actuation, for example, by electric motor, hydraulically and/or pneumatically.

Figure 1A:
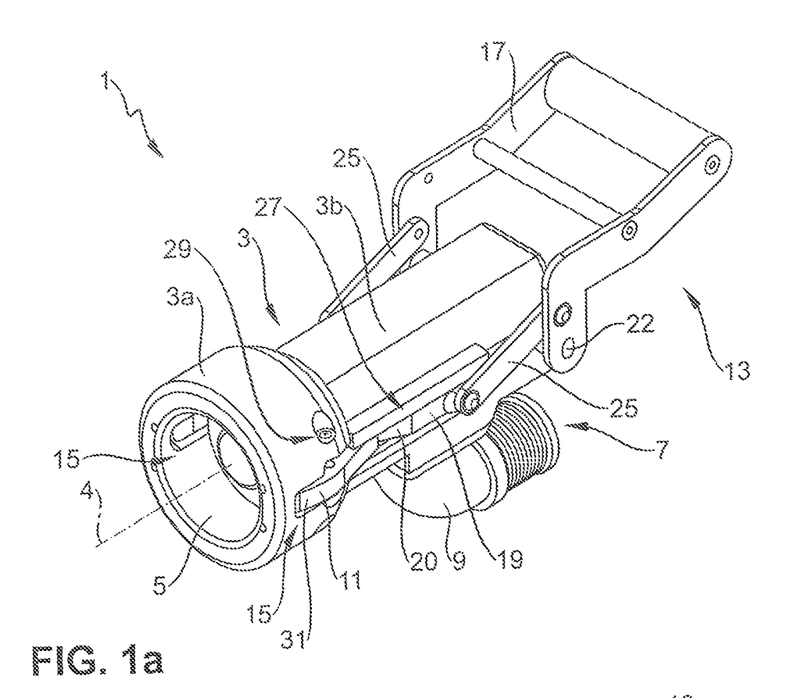
FIGS. 1a and 1b show perspective views of an extraction device according to the invention.
Figure 1B:
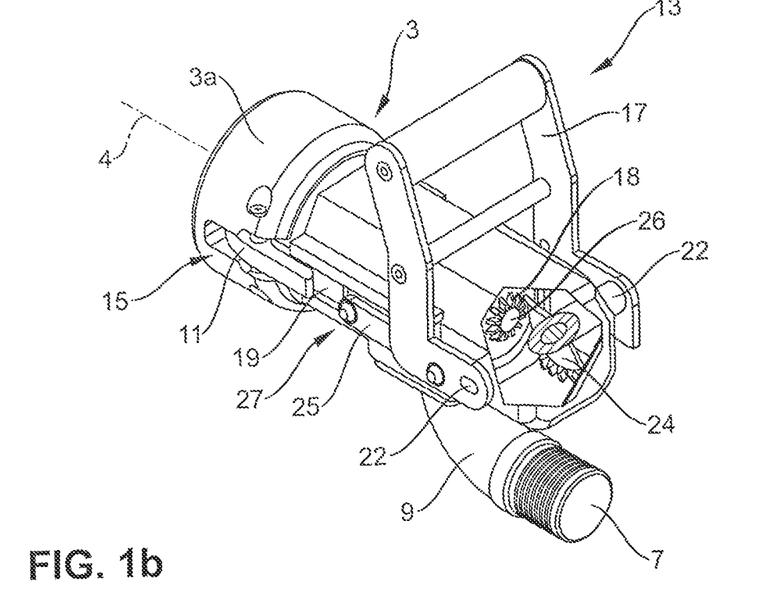

Referring to FIG. 1 an extraction device 1 according to the invention for the discharge of a mixed fluid, in particular containing feces, from a collecting tank, has a housing 3 having a mixed fluid inlet 5 and a mixed fluid outlet 7.

The housing 3 has a longitudinal axis 4, a cylindrical housing portion 3a and a housing portion 3b of a polygonal cross-section. The housing portion 3b thus has a plurality of wall segments which are arranged inclinedly relative to each other and which extend substantially straight and which extend along the longitudinal axis 4.

The mixed fluid inlet 5 can be fluidically coupled to a connection of a collecting tank (not shown) and the mixed fluid outlet 7 can be fluidically connected to a suction line (not shown). A flow passage 9 is disposed between the mixed fluid inlet 5 and the mixed fluid outlet 7.

A retaining latch 11 is also arranged on the housing 3. The retaining latch 11 is adapted to at least partially engage through a through opening 15 provided at the cylindrical housing portion 3a, in particular, in the region of the mixed fluid inlet 5. The retaining latch 11 is in that case moveable through the through opening 15 in such a way that it can come into engagement with an outlet of a collecting tank and particularly preferably with a recess of corresponding configuration in the collecting tank. There can be provided a plurality of retaining latches 11, for example 2, 3, 4, or more retaining latches.

The extraction device 1 further includes a handling means 13 which is arranged pivotably on the housing and which in the present case is in the form of a toggle lever 17. The toggle lever 17 is arranged pivotably on the housing 3 by means of a toggle lever shaft 22. In this case, the toggle lever shaft 22 is non-rotatably connected to the toggle lever 17 so that a pivotal movement of the toggle lever 17 causes rotation of the toggle lever shaft 22.

A lever 25 is rotatably arranged on the toggle lever 17 at each side of the housing 3. The lever 25 is rotatably connected to a coupling body 19. The coupling body 19 has a wedge portion 20. The coupling body 19 with the wedge portion 20 is also guided in a guide 27 extending substantially parallel to the longitudinal axis 4. Accordingly, a pivotal movement of the toggle lever 17 has the result that the pivotal movement is transformed by means of the lever 25 into a linear movement of the coupling body 19. In other words the axial position of the coupling body 19 can be adjusted by the pivotal position of the toggle lever 17. The wedge portion 20 of the coupling body 19 is adapted to come into contact with the retaining latch 11 in such a way that a movement of the coupling body 19 with the wedge portion 20 in the direction of the mixed fluid inlet 15 causes the wedge portion 20 to be pushed under the retaining latch 11.

The retaining latch 11 is mounted rotatably about a retaining latch pivot spindle 29. When the wedge portion 20 of the coupling body 19 comes into contact with the retaining latch 11, the same is lifted in the contact region between the retaining latch 11 and the wedge portion 20 of the coupling body 19 by virtue of sliding against the wedge portion 20. By virtue of the retaining latch 11 being mounted about the retaining latch pivot spindle 29, that causes a locking portion 31 of the retaining latch 11 to move inwardly through the opening 15.

In that way the locking portion 31 of the retaining latch 11 can be brought into engagement with an outlet of a collecting tank (not shown) and the extraction device 1 is accordingly reversibly coupled thereto.

The function of the toggle lever shaft 22 is described hereinafter with reference to FIG. 1b. A pivotal movement of the toggle lever 17, by virtue of the non-rotational connection of the toggle lever 17 to the toggle lever shaft 22, causes a rotary movement of the toggle lever shaft 22. A ring gear element 24 is disposed on the toggle lever shaft 22. The ring gear element 24 is in engagement with a bevel gear 18 arranged on a bevel gear shaft 26. A pivotal movement of the toggle lever 17 thus causes rotation of the bevel gear shaft 26. The bevel gear shaft 26 is, in turn, non-rotatably connected to a shut-off member 21, wherein the flow passage 9 through the extraction device 1 is opened, blocked, or constricted in dependence on the rotary position of the shut-off member 21.

Figure 2A:
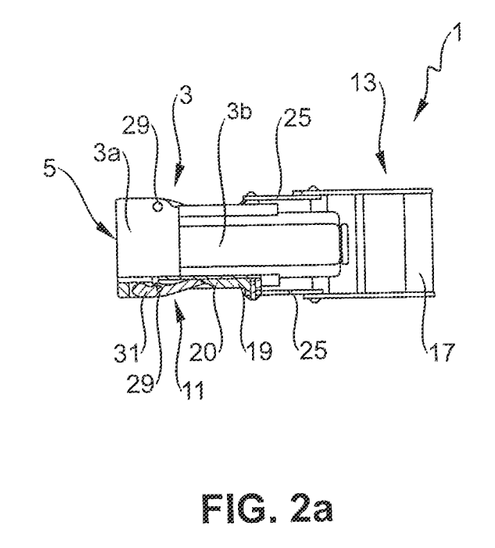
FIGS. 2a, 2b, and 2c show the extraction device according to the invention as illustrated in FIGS. 1a and 1b in a starting position with the flow passage closed.
Figure 2B:
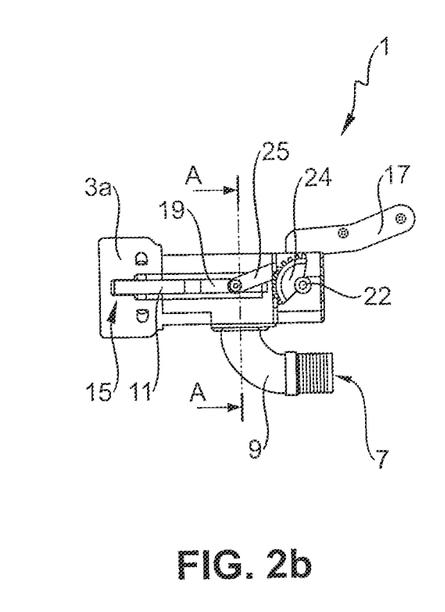
Figure 2C:
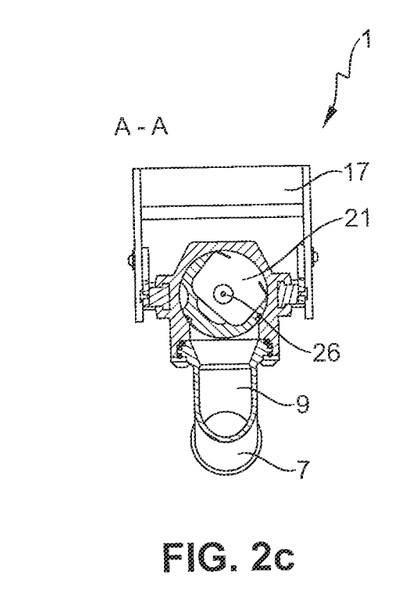
Figure 3A:
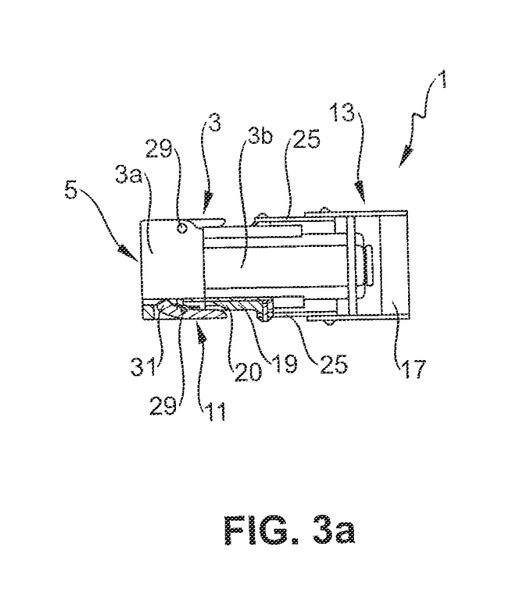
FIGS. 3a, 3b, and 3c show the extraction device according to the invention as illustrated in FIGS. 1a and 1b in a post-suction or slurp position with the flow passage partly closed.
Figure 3B:
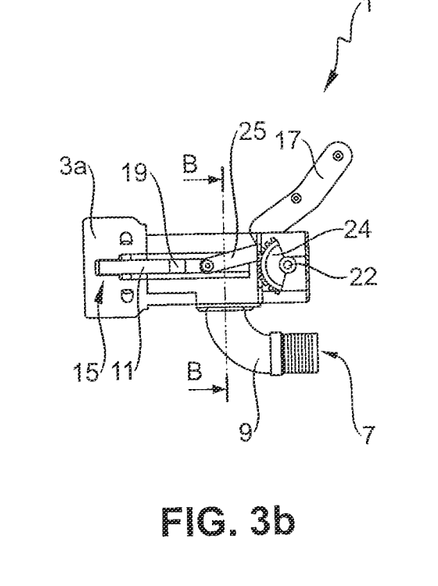
Figure 3C:
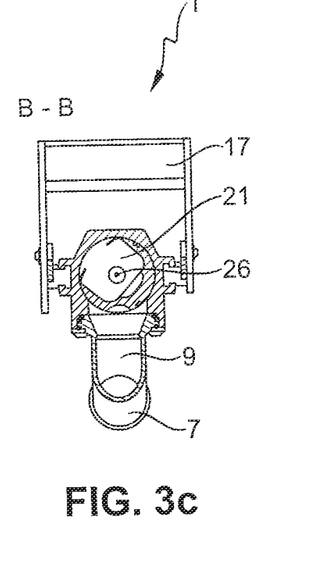
Figure 4A:
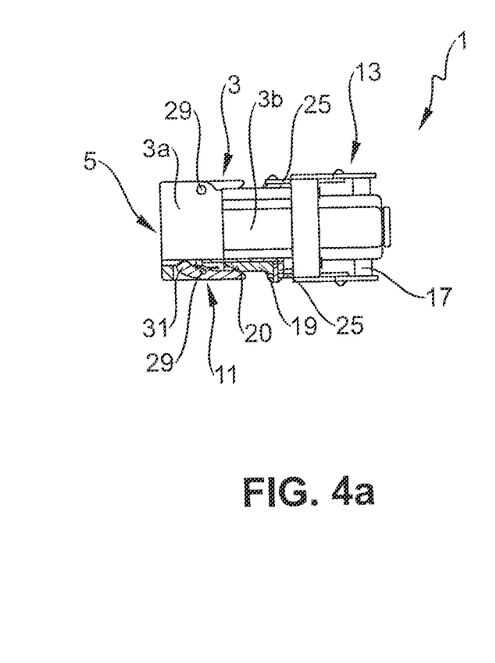
FIGS. 4a, 4b, and 4c show the extraction device according to the invention as illustrated in FIGS. 1a and 1b in a suction removal position with the flow passage open.
Figure 4B:
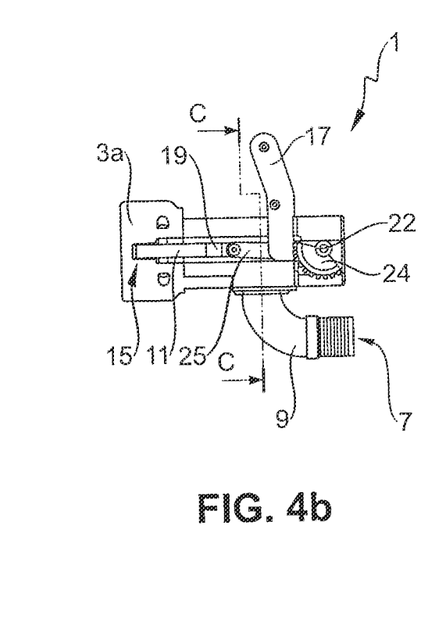
Figure 4C:
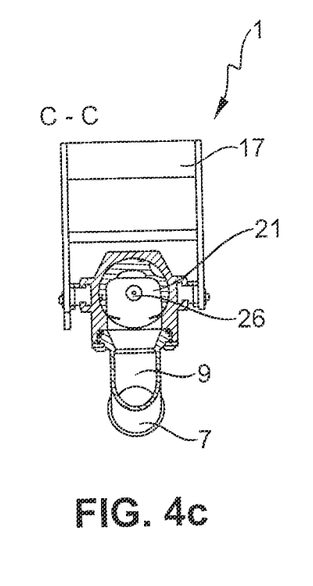

The operating states just referred to are shown in FIGS. 2 through 4.

In the state shown in FIGS. 2a through 2c, the extraction device 1 is in a starting position in which the flow passage 9 is closed by means of the shut-off member 21. Accordingly, no fluid residues can issue from the mixed fluid inlet 5. In the state in question the toggle lever 17 is in a pivotal position away from the housing 3. That position of the toggle lever 17 provides that the coupling body 19 remains moveable and, at any event, is not urged inwardly through the opening 15. For example, in the illustrated operating position, the extraction device 1 can be fitted to a connection of a collecting tank (not shown). The position of the toggle lever 17 as shown in FIGS. 2a through 2c, by way of the coupling of the toggle lever shaft to the shut-off member 21, provides that same is rotated into a blocking position. A flow of fluid through the flow passage 9 is thus prevented.

In the operating state shown in FIGS. 3a through 3c, the extraction device 1 is in a post-suction position, also referred to as the slurp position. In the post-suction position, the flow passage 9 is constricted by the shut-off member 21, but not completely closed off. By virtue of the constriction in the flow passage 9, an acceleration of the flow of fluid through the flow passage 9 is caused and turbulence is induced within the flow. Residual amounts of the mixed fluid, in particular, in the region of the mixed fluid inlet, are swirled up by the turbulent flow, that is to say, in particular, this ensures that fluid residues do not remain clinging at the mixed fluid inlet for a prolonged period of time and fluid residue amounts can then be removed from the extraction device 1.

The position of the toggle lever 17 in the operative state shown in FIGS. 3a through 3c further provides that the coupling body 19 comes into contact with the retaining latch 11 and, in particular, the wedge portion 20 of the coupling body 19 lifts the retaining latch 11 in the contact region whereby the locking portion 31 of the retaining latch 11 is moved through the opening 12. If the extraction device 1, while it is in the post-suction position, is coupled to an outlet of a collecting tank, then the extraction device 1 remains coupled to the outlet while making the transition through the post-suction position. It is only after the toggle lever 17 has been moved into the position shown in FIGS. 2a through 2c that the extraction device 1 can be removed from the collecting tank.

In FIGS. 4a through 4c, the extraction device 1 is in a suction extraction position. The position of the toggle lever 17 provides that the coupling body 19 with the wedge portion 20 lifts the retaining latch 11 in the contact region whereby the locking portion 31 of the retaining latch 11 is pivoted through the opening 15. In that way, the extraction device 1 can be fixedly and fluid-tightly connected to an outlet of a collecting tank. The position of the toggle lever 17 further provides that the shut-off member 21 is moved in known manner into an opened position so that a flow of fluid is enabled through the flow passage 9.

Figure 5A:
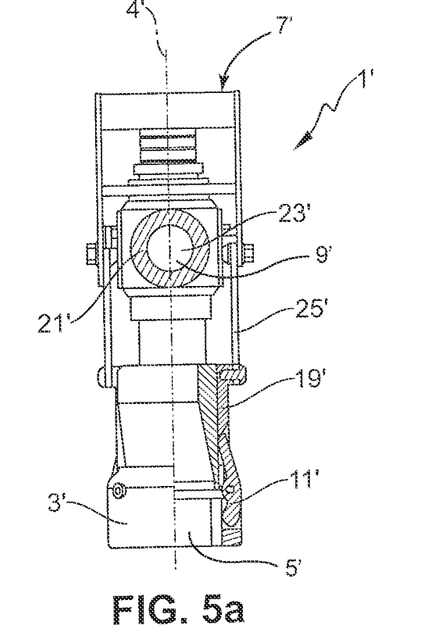
FIG. 5a shows a first side view of an alternative embodiment of an extraction device according to the invention in the unlocked state.
Figure 5B:
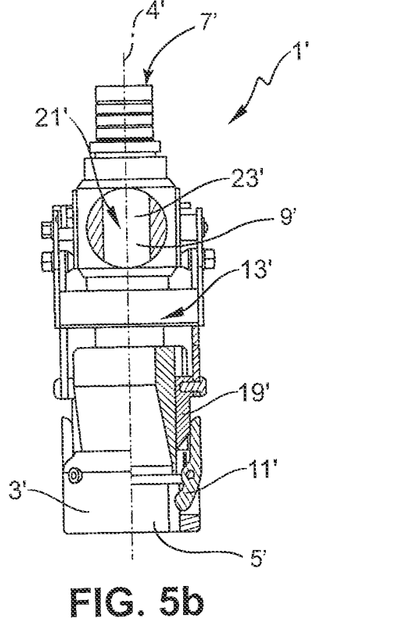
FIG. 5b shows a first side view of the alternative embodiment of the extraction device illustrated in FIG. 5a in the locked state.

FIGS. 5a and 5b show a first side view of a further preferred embodiment of the extraction device V according to the invention in a locked and an unlocked position.

In this embodiment, the extraction device 1' has a housing 3' with a mixed fluid inlet 5' and a mixed fluid outlet 7'. A closable flow passage 9' extends between the inlet and outlet.

The extraction device 1' further includes a retaining latch 11' which is mounted to the housing 3' and is adapted to cooperate with a corresponding recess on the collecting tank and is pivotably reciprocable between a locked position and an unlocked position.

A handling means 13' is further mounted to the housing 3'. The handling means 13' and the retaining latch 11' are operatively connected in such a way that, in the movement of the retaining latch 11' into the unlocked position, the shut-off member 21' is put into the blocking position. Conversely, the handling means 13' and the retaining latch 11' cooperate in such a way that in the movement of the shut-off member 21' into the release position the retaining latch 11' is put into the locked position.

The handling means 13' is here in the form of a toggle lever operatively connected to a coupling body 19', in this embodiment a wedge, which is moveable along a longitudinal axis. The coupling body 19' is adapted to reciprocate the retaining latch 11' between the locked and the unlocked positions.

The handling means 13' is adapted to actuate the shut-off member 21' with a constriction body 23'. The constriction body 23' is moveable relative to the inlet and/or outlet 7' into the blocking position and into the release position, in which respect the constriction body 23' is adapted to fluid-tightly close the flow passage 9' in the blocking position and to open it in the release position.

The handling means 13' and the coupling body 19' are operatively connected by means of a lever 25'. Upon a pivotal movement of the handling means 13' for actuation of the shut-off member 21', the pivotal movement is converted by the lever 25' into a linear movement. Consequently, the coupling body 19' moves linearly along the longitudinal axis 4'. Provided in the housing 3' is a recess 15' through which a part of the retaining latch 11', at the inlet side, can be moved by means of the pivotal movement into the locking position.

Figure 6A:
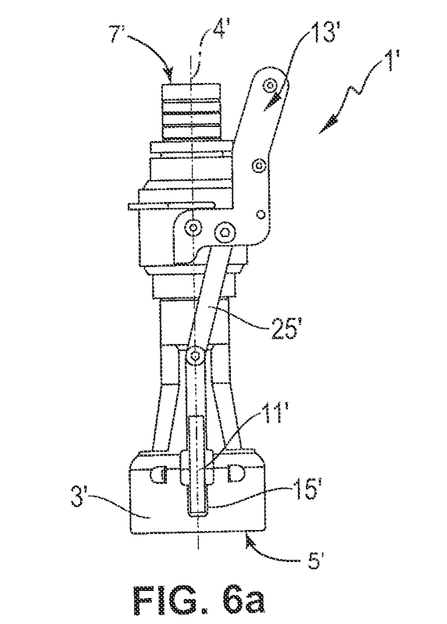
FIG. 6a shows a side view of an alternative embodiment of the extraction device illustrated in FIG. 5a in the unlocked state.
Figure 6B:
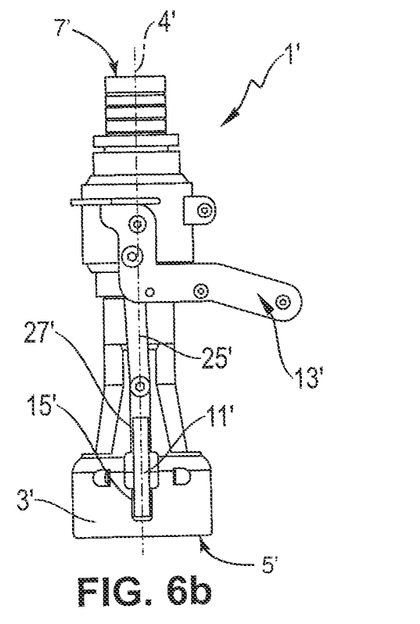
FIG. 6b shows a second side view of the alternative embodiment of the extraction device as illustrated in FIG. 5a in the locked state.

FIGS. 6a and 6b show a second side view of a further preferred embodiment of the extraction device V according to the invention in a locked and an unlocked position.

In this arrangement the coupling body 19' is guided in its movement by means of a groove 27' in the housing 3'.

The shut-off member 21' which is actuable by the toggle lever 13' is adapted to completely close the flow passage 9' in the blocking position. In the release position the flow passage 9' is opened by the shut-off member 21'.

It is also in accordance with the invention that the shut-off member 21' is further moveable into a third position, namely, a so-called slurp position, in which the flow passage is only constricted but not completely closed.

The invention claimed is:

1. An extraction device for discharging a mixed fluid from a collecting tank of a vehicle comprising:
   a housing having a mixed fluid inlet and a mixed fluid outlet;
   a flow passage extending within the housing between the mixed fluid inlet and the mixed fluid outlet;
   a retaining latch mounted to the housing and adapted to cooperate with a corresponding recess on a connection of the collecting tank, wherein the retaining latch is reciprocally displaceable between a locked position and an unlocked position;
   a shut-off member reciprocally movable between a release position and a blocking position; and
   an actuator mounted to the housing, wherein the actuator is operatively coupled with the retaining latch such that displacement of the retaining latch into the unlocked position moves the shut-off member into the blocking position;
   wherein the extraction device further includes a coupling body moveable along a longitudinal axis of the housing, and wherein the coupling body is operatively coupled with the actuator and is adapted to reciprocate the retaining latch between the locked position and the unlocked position.

2. The extraction device as set forth in claim 1, wherein the actuator is operatively coupled with the retaining latch such that movement of the shut-off member into the release position displaces the retaining latch into the locked position.

3. The extraction device as set forth in claim 1, wherein the coupling body comprises a wedge.

4. The extraction device as set forth in claim 1, wherein the actuator comprises a slider and the coupling body is provided on the slider.

5. The extraction device as set forth in claim 1, wherein the actuator comprises a toggle lever and the coupling body is coupled to the toggle lever by a rotatably mounted lever.

6. The extraction device as set forth in claim 1, wherein the housing comprises a groove adapted to guide the coupling body.

7. The extraction device as set forth in claim 1, wherein the retaining latch is mounted pivotably proximate the mixed fluid inlet and is adapted to be brought into engagement with the corresponding recess on the connection of the collecting tank.

8. The extraction device as set forth in claim 1, wherein the shut-off member is rotationally moveable within the housing and the release position and the blocking position of the shut-off member correspond to different rotary positions of the shut-off member.

9. The extraction device as set forth in claim 8, wherein the actuator is operatively coupled to the shut-off member by a gear transmission, wherein the gear transmission is adapted to convert movement of the actuator into rotational movement of the shut-off member.

10. An extraction device for discharging a mixed fluid from a collecting tank of a vehicle comprising:
a housing having a mixed fluid inlet and a mixed fluid outlet;
a flow passage extending within the housing between the mixed fluid inlet and the mixed fluid outlet;
a retaining latch mounted to the housing and adapted to cooperate with a corresponding recess on a connection of the collecting tank, wherein the retaining latch is reciprocally displaceable between a locked position and an unlocked position;
a shut-off member reciprocally movable between a release position and a blocking position; and
an actuator mounted to the housing, wherein the actuator is operatively coupled with the retaining latch such that displacement of the retaining latch into the unlocked position moves the shut-off member into the blocking position;
wherein the shut-off member is moveable into the release position, the blocking position, and a slurp position, whereby the shut-off member is adapted to open the flow passage in the release position, fluid-tightly close the flow passage in the blocking position, and constrictively open the flow passage in the slurp position such that the cross section of the flow passage is smaller in the slurp position than in the release position.

11. The extraction device as set forth in claim 10, wherein the slurp position of the shut-off member is intermediate the release position and the blocking position of the shut-off member.

12. The extraction device as set forth in claim 10, wherein the shut-off member is rotationally moveable within the housing such that the release position and the blocking position of the shut-off member correspond to different rotational positions of the shut-off member.

13. The extraction device as set forth in claim 12, wherein the slurp position corresponds to a further rotational position of the shut-off member.

14. An extraction device as set forth in claim 13, wherein the slurp position of the shut-off member is intermediate the release position and the blocking position of the shut-off member.

15. An extraction device for discharging a mixed fluid from a collecting tank of a vehicle comprising:
a housing having a mixed fluid inlet and a mixed fluid outlet;
a flow passage extending within the housing between the mixed fluid inlet and the mixed fluid outlet;
a retaining latch mounted to the housing and adapted to cooperate with a corresponding recess on a connection of the collecting tank, wherein the retaining latch is reciprocally displaceable between a locked position and an unlocked position;
a shut-off member reciprocally rotatable between a release position and a blocking position; and
an actuator rotatably mounted to the housing, wherein the actuator has a first position and a second position and is operatively coupled with the retaining latch;
wherein movement of the actuator to the first position displaces the retaining latch to the unlocked position and rotates the shut-off member to the blocking position, and movement of the actuator to the second position displaces the retaining latch to the locked position and rotates the shut-off member to the release position; and
wherein the shut-off member is moveable into the release position, the blocking position, and a slurp position, whereby the shut-off member is adapted to open the flow passage in the release position, fluid-tightly close the flow passage in the blocking position, and constrictively open the flow passage in the slur position such that the cross section of the flow passage is smaller in the slur position than in the release position.

16. The extraction device as set forth in claim 15, wherein the actuator has the first position, the second position, and a third position intermediate the first position and the second position, and wherein movement of the actuator to the third position rotates the shut-off member to the slurp position.

17. An extraction device for discharging a mixed fluid from a collecting tank of a vehicle comprising:
a housing having a mixed fluid inlet and a mixed fluid outlet;
a flow passage extending within the housing between the mixed fluid inlet and the mixed fluid outlet;
a retaining latch mounted to the housing and adapted to cooperate with a corresponding recess on a connection of the collecting tank, wherein the retaining latch is reciprocally displaceable between a locked position and an unlocked position;
a shut-off member reciprocally rotatable between a release position and a blocking position;
an actuator mounted to the housing; and
a coupling body moveable along a longitudinal axis of the housing, operatively coupled with the actuator, and adapted to reciprocate the retaining latch between the locked position and the unlocked position;
wherein the actuator is operatively coupled with the coupling body, retaining latch, and the shut-off member such that movement of the actuator to a first position displaces the coupling body and retaining latch to the unlocked position and rotates the shut-off member to the blocking position and movement of the actuator to a second position displaces the coupling body and retaining latch to the locked position and rotates the shut-off member to the release position.

18. The extraction device as set forth in claim 17, wherein the actuator is operatively coupled to the shut-off member by a gear transmission, wherein the gear transmission is adapted to convert movement of the actuator between the first position and the second position into rotational movement of the shut-off member.

* * * * *